Patented July 10, 1945

2,379,950

UNITED STATES PATENT OFFICE 2,379,950

INK COMPOSITIONS

Irwin C. Clare, Elmhurst, Del., assignor to Hercules Powder Company, Wilmington, Del., a corporation of Delaware No Drawing. Application February 9, 1942, Serial No. 430,080

3 Claims. (Cl. 106—23)

This invention relates to typographic ink compositions, and more particularly to improved typographic ink compositions having improved properties of length and flow-out.

In typographic printing, type is employed to convey the impression to the paper. Ink compositions used in typographic printing are generally quite fluid, in order that they may have the characteristic of rapid drying required by modern high-speed presses. The degree of fluidity of the typographic ink composition will vary with the roughness of the surface of the paper into which the composition penetrates in drying, with different types of presses, with different press speeds, with variations in temperature and humidity, and with other factors. Typographic ink compositions for high-speed presses are generally composed mainly of mixtures of mineral oils and carbon black. For slower-moving presses, the vehicles often comprise resins dissolved in mineral oil.

Ordinary rosin has been used in typographic ink compositions since it improves the rate of set and decreases show through. However, its use in such compositions has been seriously restricted by its tendency to shorten the ink, that is, to cause the composition to attain a buttery consistency. A buttery ink composition is very unsatisfactory for high-speed press work. In the past, a long ink containing rosin has generally been accompanied by a tendency to flow out from under the type, thereby giving blurred impressions. Hence, the formulator has been definitely restricted in preparing inks containing rosin of suitable length and flow-out properties for use on the higher speed presses.

Now, in accordance with this invention, typographic ink compositions having increased length, better flow-out properties, less crystallization, and less sludge formation than inks containing natural rosin are provided by utilizing polymerized rosin as the resin constituent of the ink. More specifically, these improved typographic inks comprise polymerized rosin dissolved in a suitable solvent, such as 22° Baumé mineral ink oil, in admixture with a pigment or mixture of pigments. If desired, driers and modifiers may be incorporated.

Having thus indicated in a general way the nature and purpose of this invention, there follow specific examples to illustrate the practice thereof:

*Example I*

In order to prepare a web press black news print ink, the following procedure was employed:

A polymerized rosin, mineral oil varnish was prepared containing the following:

| | Parts |
|---|---|
| Mineral ink oil, 22° Baumé | 180 |
| Sulfuric acid polymerized rosin, acid number 155, drop melting point 100° C., Lovibond color 23 Amber | 120 |

The above ingredients were heated to 350° F. and held at that temperature for 30 minutes. A blue toner was prepared according to the following:

| | Parts |
|---|---|
| Oleic acid | 120 |
| Victoria blue, B base | 20 |

The dye was dissolved in the acid by mild heating. An ink was then prepared according to the following formula:

| | Parts |
|---|---|
| Mineral oil, polymerized rosin varnish | 178 |
| Blue toner | 2 |
| Carbon black | 20 |

The carbon black was ground with the varnish and toner by giving the mixture five passes through a three roll steel mill.

A similar varnish and corresponding ink were prepared using FF wood rosin in place of the polymerized wood rosin. After aging for three days, the ink containing the polymerized rosin was found to have considerably more length than the ink prepared from the corresponding FF wood rosin. On application, the polymerized rosin ink had improved flow-out and less tendency to offset and less show through than the FF wood rosin ink.

*Example II*

A red news ink was prepared containing the following ingredients:

| | Parts |
|---|---|
| Lithol red toner | 60 |
| China clay | 50 |
| Mineral oil, 22° Baumé | 185 |
| Polymerized rosin, acid number 150, drop melting point 109° C | 75 |
| No. 0 Litho oil | 125 |
| Lead linoleate paste (18% lead) | 6 |
| Manganese linoleate paste (5.8% manganese) | 4 |
| Cobalt linoleate paste (5.6% cobalt) | 2.5 |

The polymerized rosin was dissolved in the mineral oil by heating to 350° F., and the litho oil and driers were then mixed with the varnish so obtained. The resulting vehicle was mixed with the pigment and given four passes through a three-roll steel mill. A comparison ink was made with an N wood rosin having the following analysis:

Drop melting point_____°C__ 89
Acid number_____ 155

An examination of the two inks showed the ink containing the polymerized rosin to be longer and to give a soft paste having better flow-out properties than the ink prepared with the N wood rosin.

*Example III*

A half-tone black ink was prepared containing the following ingredients:

| | Parts |
|---|---|
| Mineral ink oil, 22° Baumé | 62 |
| Sulfuric polymerized rosin with hydrogen bleach, acid number 144, drop melting point 104° C., Lovibond color 21 Amber | 26 |
| No. 1 paraffin oil | 8 |
| Cobalt linoleate paste (5.6% cobalt) | 8 |
| Japan drier | 16 |
| Carbon black pigment | 28 |
| Toning blue (as described in Example 1) | 44 |

The polymerized rosin was dissolved in the mineral ink oil by mild heating, the balance of vehicle constituents added and dissolved, and the cooled vehicle then mixed with the pigment. The paste was then given three passes through a three roll steel mill.

A comparison ink was prepared using FF wood rosin instead of the polymerized rosin. The ink containing the polymerized rosin was much longer and smoother than the ink prepared containing the FF wood rosin. The polymerized rosin ink had no tendency to form ridges on application as did the FF wood rosin ink, and had better flow-out than the latter. The FF wood rosin ink also tended to string out as the type was pulled away from the paper stock, but this tendency was not exhibited by the polymerized rosin ink.

*Example IV*

A typographic ink vehicle containing the following ingredients was prepared:

| | Parts |
|---|---|
| Boron trifluoride polymerized rosin, acid number 166, drop melting point 98.5° C., Lovibond color 23 Amber | 50 |
| Spindle oil (Spinesso No. 5) | 50 |

These ingredients were heated to 300° F. and the mixture stirred until the rosin dissolved.

Two similar vehicles were prepared, one using I wood rosin instead of the polymerized rosin and the other using I gum rosin instead of the polymerized rosin. When the three vehicles were permitted to stand, the vehicles containing I wood and I gum rosin developed crystal and sludge formation, respectively, within a four day period, but the vehicle containing polymerized rosin stood for three months at room temperature without crystal or sludge formation.

The foregoing examples illustrate that considerable improvement in typographic inks with respect to length, flow out properties, freedom from crystallization, and freedom from sludge formation may be accomplished by inclusion of polymerized rosin in such inks in accordance with this invention.

As shown in the examples, an ink vehicle is prepared by dissolving polymerized rosin in a suitable solvent, with or without the aid of heating to provide solution. Pigments, driers, and modifiers are then added to the vehicle, the amounts of these depending upon the specific qualities desired by the formulator. A uniform typographic ink composition is then prepared in the customary manner by the use of suitable mixing means, such as a three roll steel mill.

In place of the polymerized rosins shown in the examples, any other polymerized rosin, obtained by polymerization of any of the various grades of wood or gum rosin, or the rosin acids contained therein, such as, for example, abietic acid, pimaric acid, sylvic acid, sapinic acid, etc., may be employed. Thus, the polymerized rosin may be obtained by polymerization of such rosins or rosin acids according to any of the known methods, such as, for example, by treatment with various catalysts such as sulfuric acid, organic substituted sulfuric acids, phosphoric acid, boron fluoride, metallic halides, as zinc chloride, aluminum chloride, hydrofluoric acid, or by treatment of the rosins with a high voltage, high frequency electric discharge. The polymerization of rosin by any of the procedures mentioned above is carried out usually by treatment of the rosin dissolved in a suitable inert organic solvent, such as, for example, gasoline, benzene, ethylene chloride, etc. After polymerization, if desired, the polymerized rosin may be refined by a suitable refining treatment, such as contacting with selective color body solvents, adsorbents, etc., or by suitable heat treatment.

The polymerized rosins which are useful in the preparation of the novel typographic inks may vary in drop melting point from about 90 to about 175° C. The proportion of polymerized rosin useful in the typographic ink compositions of this invention may be from about 2 to about 65% of the total ink composition, and preferably from about 5 to about 55% of the total composition.

Any suitable solvent for the polymerized rosin may be used, depending upon the specific properties desired by the formulator. Mineral oils were used in the examples, but coal tar hydrocarbons, as benzol, toluol, xylol, etc.; petroleum hydrocarbons, as gasoline, hexane, heptane, spindle oil, etc.; alicyclic aromatic compounds, as tetrahydronaphthalene, decahydronaphthalene, and Solvesso No. 1, 2, 3, and 4; terpenes, etc. are all suitable solvents.

These typographic ink compositions may contain drying oils, such as, for example, bodied linseed oil, bodied castor oil, bodied tung oil, etc., but to obtain the maximum rate of drying the use of these materials is definitely restricted. Driers, such as the cobalt linoleate and Japan drier used in the examples, may also be employed in the typographic ink compositions. Lead and manganese naphthenates are also suitable.

In place of the carbon black used in the examples, any of the pigments usually employed in the art may be employed, such as, for example, lamp black, peacock blue, iron blues, lithol toner, gloss white, whiting, alumina hydrate, titanium dioxide, titanium base pigments, and others. Dark pitches such as stearine pitch, petroleum asphalt, or black resins such as gilsonite may also be used in the typographic ink compositions.

To overcome the brownish tone of the oil and carbon black, an oil-soluble toner may be added to the vehicle before the addition of the carbon black. Suitable dyes for preparing toners are the Victoria Blue base, used in Examples 1 and 3, Methylene Blue base, Methyl Violet base, nigrosine, or induline.

Compositions containing polymerized rosin prepared as described above provide improved typographic ink compositions. These improved typographic inks containing polymerized rosin are characterized by increased length and improved flow-out properties, while at the same time the tendency of the inks to spread during the printing operation is not affected. Furthermore, typographic inks containing polymerized rosin have fast drying qualities and improved gloss. Also, inks containing polymerized rosin will remain free from crystals and sludge even after months of standing.

What I claim and desire to protect by Letters Patent is:

1. A typographic ink composition comprising polymerized rosin, mineral oil, and a pigment said rosin having a drop melting point between about 90 and about 175° C., and said rosin comprising between about 2 and about 65% of said composition.

2. A typographic ink composition comprising polymerized rosin, mineral oil, a pigment, and a toner said rosin having a drop melting point between about 90 and about 175° C., and said rosin comprising between about 2 and about 65% of said composition.

3. A typographic ink composition comprising polymerized rosin, mineral oil, carbon black, and a toner said rosin having a drop melting point between about 90 and about 175° C., and said rosin comprising between about 2 and about 65% of said composition.

IRWIN C. CLARE.